(12) United States Patent
Bao et al.

(10) Patent No.: US 11,201,836 B2
(45) Date of Patent: Dec. 14, 2021

(54) METHOD AND DEVICE FOR MANAGING STATEFUL APPLICATION ON SERVER

(71) Applicant: EMC IP Holding Company LLC, Hopkinton, MA (US)

(72) Inventors: Jie Bao, Shanghai (CN); Kun Wang, Beijing (CN); Junping Frank Zhao, Beijing (CN); Layne Lin Peng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/021,236

(22) Filed: Jun. 28, 2018

(65) Prior Publication Data

US 2019/0007339 A1 Jan. 3, 2019

(30) Foreign Application Priority Data

Jun. 30, 2017 (CN) .......................... 201710526541.1

(51) Int. Cl.
| | |
|---|---|
| *G06F 15/16* | (2006.01) |
| *H04L 12/911* | (2013.01) |
| *H04L 29/08* | (2006.01) |
| *H04L 29/06* | (2006.01) |
| *G06F 3/06* | (2006.01) |
| *G06F 9/50* | (2006.01) |

(52) U.S. Cl.
CPC .......... *H04L 47/821* (2013.01); *G06F 3/0605* (2013.01); *G06F 3/067* (2013.01); *G06F 3/0631* (2013.01); *G06F 9/5005* (2013.01); *H04L 67/1097* (2013.01); *H04L 67/42* (2013.01)

(58) Field of Classification Search
CPC ... H04L 47/821; H04L 67/1097; H04L 67/42; G06F 3/0605
USPC ......................................................... 709/203
See application file for complete search history.

(56) References Cited

U.S. PATENT DOCUMENTS

| | | | |
|---|---|---|---|
| 7,328,144 B1 * | 2/2008 | Grier ...................... | G06F 9/546 |
| | | | 703/22 |
| 7,676,628 B1 * | 3/2010 | Compton .............. | G06F 3/0665 |
| | | | 711/114 |
| 7,870,265 B2 | 1/2011 | Kramer et al. | |
| 8,396,807 B1 * | 3/2013 | Yemini ............. | H04L 29/08153 |
| | | | 705/59 |
| 8,782,221 B2 | 7/2014 | Han | |

(Continued)

FOREIGN PATENT DOCUMENTS

| | | |
|---|---|---|
| CN | 1720703 A | 1/2006 |
| CN | 1836416 A | 9/2006 |

(Continued)

*Primary Examiner* — George C Neurauter, Jr.
*Assistant Examiner* — Joel Mesa
(74) *Attorney, Agent, or Firm* — Ryan, Mason & Lewis, LLP

(57) ABSTRACT

Embodiments of the present disclosure relate to a method and a device for managing a stateful application on a server. The method includes, in response to receiving a first request from a client for initializing the stateful application, allocating a storage resource to the stateful application. The method further includes, in response to receiving a second request from the client for processing data, storing the data in the storage resource. The method also includes enabling the stateful application to process the stored data.

20 Claims, 6 Drawing Sheets

(56) References Cited

U.S. PATENT DOCUMENTS

| | | | |
|---|---|---|---|
| 9,645,839 B2 | 5/2017 | Jacobson et al. | |
| 9,740,606 B1* | 8/2017 | McKelvie | G06F 3/0655 |
| 2017/0126812 A1* | 5/2017 | Singhal | H04L 67/42 |
| 2018/0364949 A1* | 12/2018 | Aston | G06F 3/061 |

FOREIGN PATENT DOCUMENTS

| | | |
|---|---|---|
| CN | 101253492 A | 8/2008 |
| CN | 102521022 A | 6/2012 |
| CN | 103023963 A | 4/2013 |
| CN | 103023993 A | 4/2013 |
| CN | 103034536 A | 4/2013 |
| CN | 103327549 A | 9/2013 |
| CN | 103533018 A | 1/2014 |
| CN | 106897947 A | 6/2017 |
| WO | 2004068367 A2 | 8/2004 |
| WO | 2005018203 A1 | 2/2005 |

\* cited by examiner

METHOD AND DEVICE FOR MANAGING STATEFUL APPLICATION ON SERVER

RELATED APPLICATIONS

This application claims priority from Chinese Patent Application Number CN201710526541.1, filed on Jun. 30, 2017 at the State Intellectual Property Office, China, titled "METHODS AND DEVICES FOR MANAGING STATEFUL APPLICATION ON SEVER" the contents of which is herein incorporated by reference in its entirety.

FIELD

Embodiments of the present disclosure relate to a method and a device for managing an application on a server, and more specifically, to a method and a device for managing a stateful application on a server.

BACKGROUND

With a rapid development of the Internet technology, a lot of service providers provide services for clients through a large-scale server. The server of a service provider can process various services and data for the client. Meanwhile, since the cost of some hardware devices is high, it is inappropriate for a user to directly configure the hardware and resource waste also occurs due to a low utilization thereof. However, the cost can be reduced by configuring these high-cost devices at the service provider to provide services to a number of clients. Therefore, a user can obtain the services rapidly at a low cost when using a server of a service provider, thereby promoting utilization of the resource.

In the rapid development of the network device, a number of program applications are developing fast from the initial simple application program to current various large-scale operating systems. By operating the software program on a computer, the information processing efficiency is improved quickly. The various applications include a stateful application which is used for processing previous and subsequent requests in a dependent relation in an application program. Due to application of the stateful application program, the function of the program is improved remarkably and the use scope is broadened.

SUMMARY

An objective of embodiments of the present disclosure is to provide a method and a device for managing a stateful application on a server.

In accordance with a first aspect of the present disclosure, there is provided a method of managing a stateful application on a server. The method comprises, in response to receiving a first request from a client for initializing the stateful application, allocating a storage resource to the stateful application. The method further comprises, in response to receiving a second request from the client for processing data, storing the data in the storage resource. The method also comprises enabling the stateful application to process the stored data.

In some embodiments, the method further comprises: transmitting an indication for the allocated storage resource to the client, and wherein storing the data comprises: extracting the indication for the storage resource from the second request; and determining, based on the indication, the storage resource to store the data.

In some embodiments, the method further comprises: allocating a state buffer to the stateful application; and storing, in the state buffer, state data generated by the stateful application during the processing of the data, the state data indicating data required for processing a subsequent request.

In some embodiments, allocating a storage resource to the stateful application comprises: determining a priority of the stateful application; and allocating the storage resource based on the priority.

In some embodiments, allocating the storage resource based on the priority comprises: in response to the storage resource, comparing a first priority of the stateful application with a second priority of a previous stateful application having been operated on the server; and in response to the first priority being lower than the second priority, suspending the initializing of the stateful application to wait for the storage resource.

In some embodiments, the method further comprises: in response to receiving a request from the client for initializing a subsequent stateful application, determining whether an available storage resource is sufficient to satisfy the initializing of the subsequent stateful application; in response to the available storage resource being insufficient, comparing a first priority of the stateful application with a third priority of the subsequent stateful application; and in response to the first priority being lower than the third priority, re-allocating at least a part of the storage resource allocated to the stateful application to the subsequent stateful application.

In accordance with a second aspect of the present disclosure, there is provided a server. The server comprises: a processor; and a memory having computer program instructions stored thereon, the processor executing the computer program instructions in the memory to control the electronic device to perform acts comprising: in response to receiving a first request from a client for initializing the stateful application, allocating a storage resource to the stateful application; in response to receiving a second request from a client for processing data, storing the data into the storage resource; and enabling the stateful application to process the stored data.

In accordance with a third aspect of the present disclosure, there is provided a computer program product being tangibly stored on a non-volatile computer storage medium and comprising machine-executable instructions which, when executed, cause a machine to perform steps of the method according to the first aspect of the present disclosure.

BRIEF DESCRIPTION OF THE DRAWINGS

Through the following detailed description on the example embodiments of the present disclosure with reference to the accompanying drawings, the above and other objectives, features, and advantages of the present disclosure will become more apparent, in which the same reference signs refer to the same components.

Figure 1:
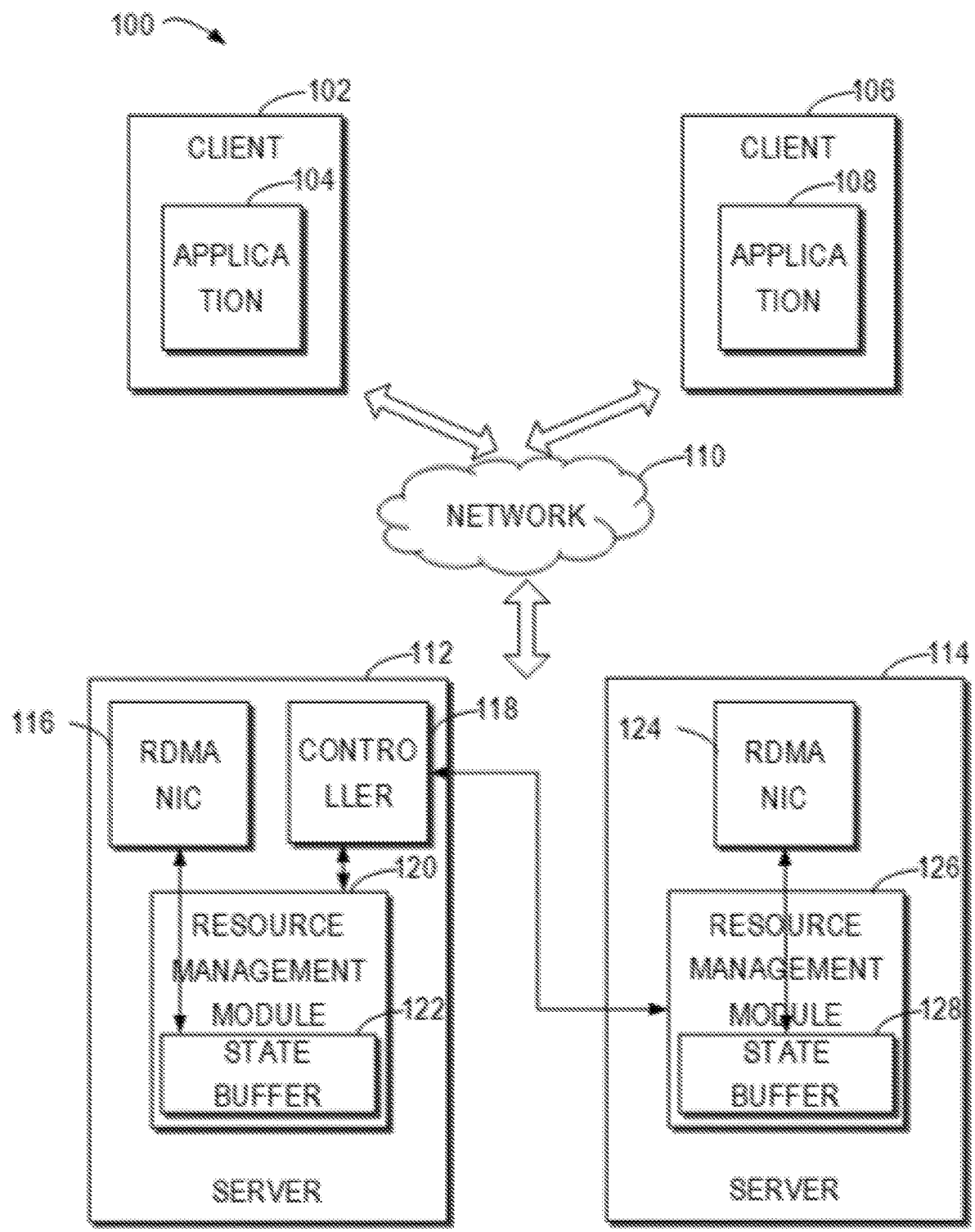
FIG. 1 illustrates an architecture diagram of a network system 100 according to embodiments of the present disclosure.

In each drawing, the same or corresponding reference signs represent the same or corresponding components.

DETAILED DESCRIPTION OF EMBODIMENTS

The example embodiments disclosed herein will be described with reference to the accompanying drawings. Although the drawings illustrate some embodiments of the present disclosure, it would be appreciated that the present disclosure can be implemented in various forms but cannot be limited to the embodiments described herein. Rather, these embodiments are provided to disclose the present disclosure more thoroughly and completely. It would be appreciated that the drawings and embodiments of the present disclosure are only provided as examples, but not used to restrict the protection scope of the present disclosure.

As used herein, the term "includes" and its variants are to be considered as open-ended terms that mean "includes, but is not limited to." The term "based on" is to be understood as "based at least in part on." The term "one embodiment" or "the embodiment" is to be read as "at least one example embodiment." The terms "first," "second," and the like may refer to different or same objects. Other definitions, explicit and implicit, may be included below.

Principles of the present disclosure are described below with reference to several example embodiments as shown in the drawings. Although the drawings illustrate the preferred embodiments described herein, these embodiments are described only to enable those skilled in the art to better understand and further implement the present disclosure, but not used to limit the protection scope of the present disclosure in any manner.

Since various hardware and software devices of the current server have powerful functions, a plurality of applications of a client are desired to be operated on the server, to allow the user to use hardware and software with higher configuration to process services and data, thereby rapidly improving data processing. As the cost of hardware acceleration devices is typically high and a common user does not use them frequently, it is inappropriate for the common user to purchase such devices. However, the server end is capable of configuring these acceleration devices, and thus, the problem that a user has using these hardware devices provided by the server needs to be solved.

On the other hand, the stateful application is used frequently, but due to a need of transmitting stateful data between a previous and a subsequent request of the stateful application, a large amount of stateful data is required to be transmitted when the stateful application for the client is placed at the server to process, thereby causing a problem that the stateful application cannot be processed efficiently using a server.

In order to solve at least the above and other potential problems, embodiments of the present disclosure provide a solution of operating a stateful application on a server. In the solution, the stateful application on a server is operated by allocating a resource to the stateful application on the server.

In order to describe the operation of the stateful application on a server in detail, description will be made with reference to the drawings. FIG. 1 illustrates an architecture diagram of a network system 100 according to embodiments of the present disclosure.

The network system 100 includes clients 102, 106, servers 112, 114 and a network 110 through which the clients 102, 106 can communicate with the servers 112, 114.

In the embodiments of the present disclosure, the network system includes two clients and two servers, and this is provided as an example, without intending to limit the number of the clients and the servers. Therefore, the number of the clients and the servers may be any number.

The client device 102 refers to various computer devices that can operate a stateful application. The client device 102 can be a wired client, or can be a wirelessly connected client. The client device 102 can be a desktop computer, a notebook, a laptop computer, a handheld terminal, a wearable device and the like. In an alternative embodiment, the client device 102 can be various computer devices to be used in the future.

A stateful application 104 is installed on the client device 102. The term "stateful application" used herein refers to an application in which a subsequent request is dependent on a previous request, i.e., the previous request and the subsequent request are not independent of each other. One example of the stateful application is a data compression application. When the data to be compressed by the compression application is implemented through multiple requests, some information in the preceding compressed data is required to be used to the subsequent compressed request. Another example of the stateful application is a stateful Web application with Session and Cookies mechanisms, and the data required between the previous and subsequent requests are preserved through Session and Cookies. Stateful data are generated when the stateful application is operated, which indicates data required for processing the subsequent request. In the embodiments of the present disclosure, the clients 102, 106 respectively have an application 104, 108, which is only provided as an example, without intending to limit the number of applications operated in the client. In an alternative embodiment, the number of applications may be any number.

The network 110 in the network system 100 may be various networks capable of implementing a data transfer function. The network 110 can be a local area network, a wide area network, Internet, a Broadband Integrated Services Digital Network and the like. In an alternative embodiment, the network 110 can implement remote access to a DMA. In an alternative embodiment, the client and the server end cannot be connected directly via a network. In another alternative embodiment, management data of the client and the server can be transferred via the network 110, while the data required to be processed in the application are transmitted via a dedicated line for implementing DMA access.

The server 112 includes a controller 118, and the controller 118 can receive requests sent by the stateful applications 104, 108 in the clients 102, 106 and then select a server having required resources satisfying stateful application requests from the server 112 and the server 114. Then, the indication of the storage resource allocated by the server is transmitted to the clients. The controller 118 is also used to monitor a use condition in a state buffer when the stateful application is operated on the server, and performing corresponding processing for the stateful application. In another alternative embodiment, the controller 118 can be arranged on the server 114. In another alternative embodiment, the controller 118 can be arranged on another server. In another alternative embodiment, the controller 118 can be arranged on any network device connected with the server.

The Remote Direct Memory Access (RDMA) network interface controllers 116, 124 are arranged on the servers 112, 114, such that the servers 112, 114 can directly receive a data processing request via the network. In an alternative embodiment, data received via the network interface controllers 116, 124 can be received via a general network interface.

The resource management modules 120, 126 are also arranged on the servers 112, 114 for managing allocation of storage resources. The resource management modules 120, 126 include state buffers 122, 128 allocated to the stateful application, where the state buffers 122, 128 are used for storing state data of the stateful application.

Figure 2:
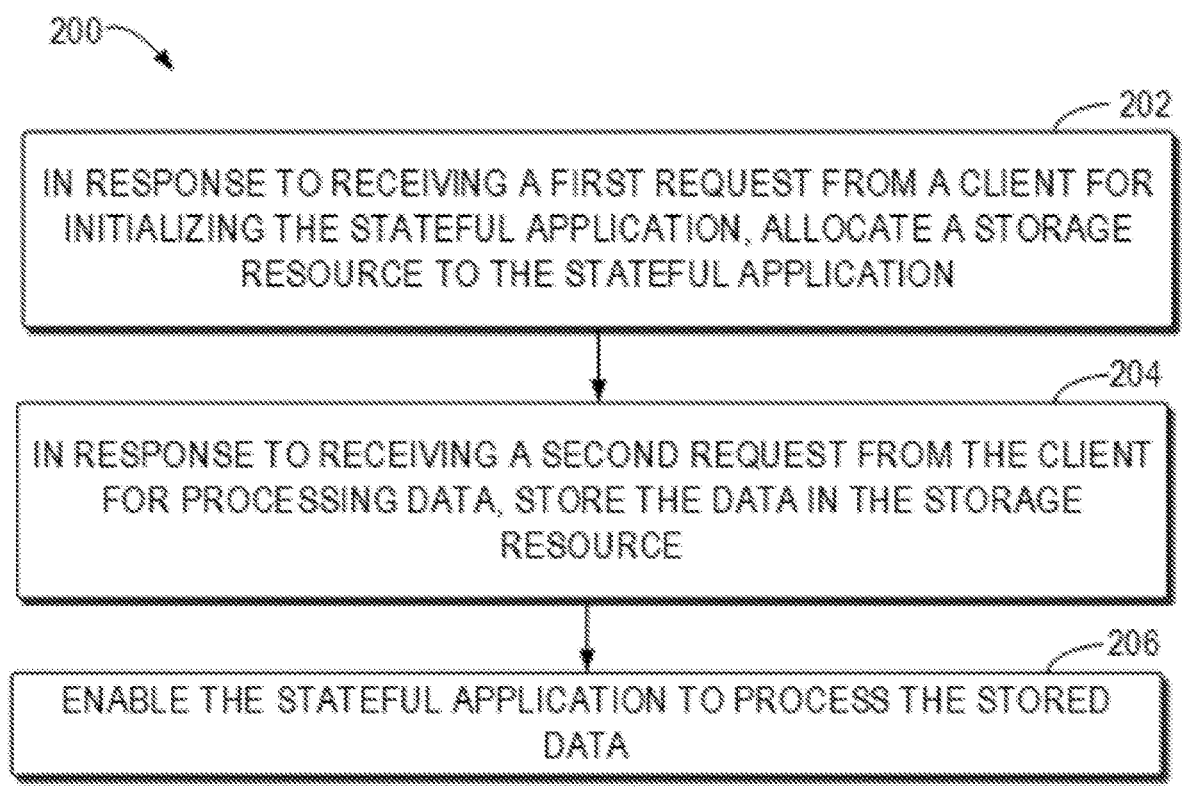
FIG. 2 illustrates a schematic diagram of a method 200 of performing a stateful application on a server end.

The network system 100 for operating a stateful application has been introduced above, and a process of operating a stateful application at a server will be described below in detail with reference to FIG. 2.

When a user is using the clients 102, 106, if the user operates stateful applications 104, 108 on the clients 102, 106, the stateful applications are activated. After being activated, unlike the programs previously operated on client, the stateful applications transmit an initialization request to the server at an initialization operation, rather than being initialized at the clients.

The stateful applications 104, 108 transmit a stateful application initialization request to the server via the network after being activated, which is referred to as a first request, for ease of description. Upon receiving the initialization request, the controller 118 searches which server has a storage resource satisfying the requirement. When there is the server satisfying the requirement, in response to receiving the first request from the client for initializing the stateful application, the storage resource is allocated to the stateful application at 202.

After allocating the storage resource to the stateful application, the server transmits an indication for the allocated storage resource via the controller 118 to the client. In an alternative embodiment, the indication is an identifier indicating the allocated storage resource. In another alternative embodiment, the indication is address information of the allocated storage resource. In another alternative embodiment, the indication can be any other information for determining the storage resource location.

After transmitting the initialization request to the network, the clients 102, 106 wait for indication information from the server ends 112, 114. When the stateful application in the clients 102, 106 receives an indication for the allocated storage resource, the clients 102, 106 know that the server 112 or 114 has prepared the storage resource for the stateful application. The clients 102, 106 then generate the data request based on the data to be processed and the indication information received from the server 112 or 114, and the data request is transmitted to the server 112 or 114 for processing. The transmitted data processing request can be transmitted via a network supporting the remote DMA. In an alternative embodiment, data can be transmitted via other networks. In an alternative embodiment, the data processing request can be directly transmitted via a connected line. In an alternative embodiment, the data processing request can be transmitted via any transmission network or line.

Based on the indication, the data processing request of the stateful application is transmitted to the server. In an alternative embodiment, the data processing request accesses the allocated storage resource via a network supporting the RDMA through a RDMA network interface controller. In another alternative embodiment, it can be transmitted via a general network to the server.

Upon receiving the data processing request transmitted by the client, at block 204, in response to receiving the data processing request from the client for processing the data, the server stores the data in the data processing request into the storage resource, and the data processing request is also referred to as a second request, for ease of description.

After storing the data into the storage resource, the stateful application program scheduled by the processing request is operated, and the stateful application is used on the server to process the stored data.

In the data processing procedure, the controller 118 can monitor configuration of the storage resource, and further manage allocation of the stored resource.

The procedure of activating and operating the stateful application on the server has been described above. Another example of operating a stateful application on the server will be described below with reference to FIG. 3.

Figure 3:
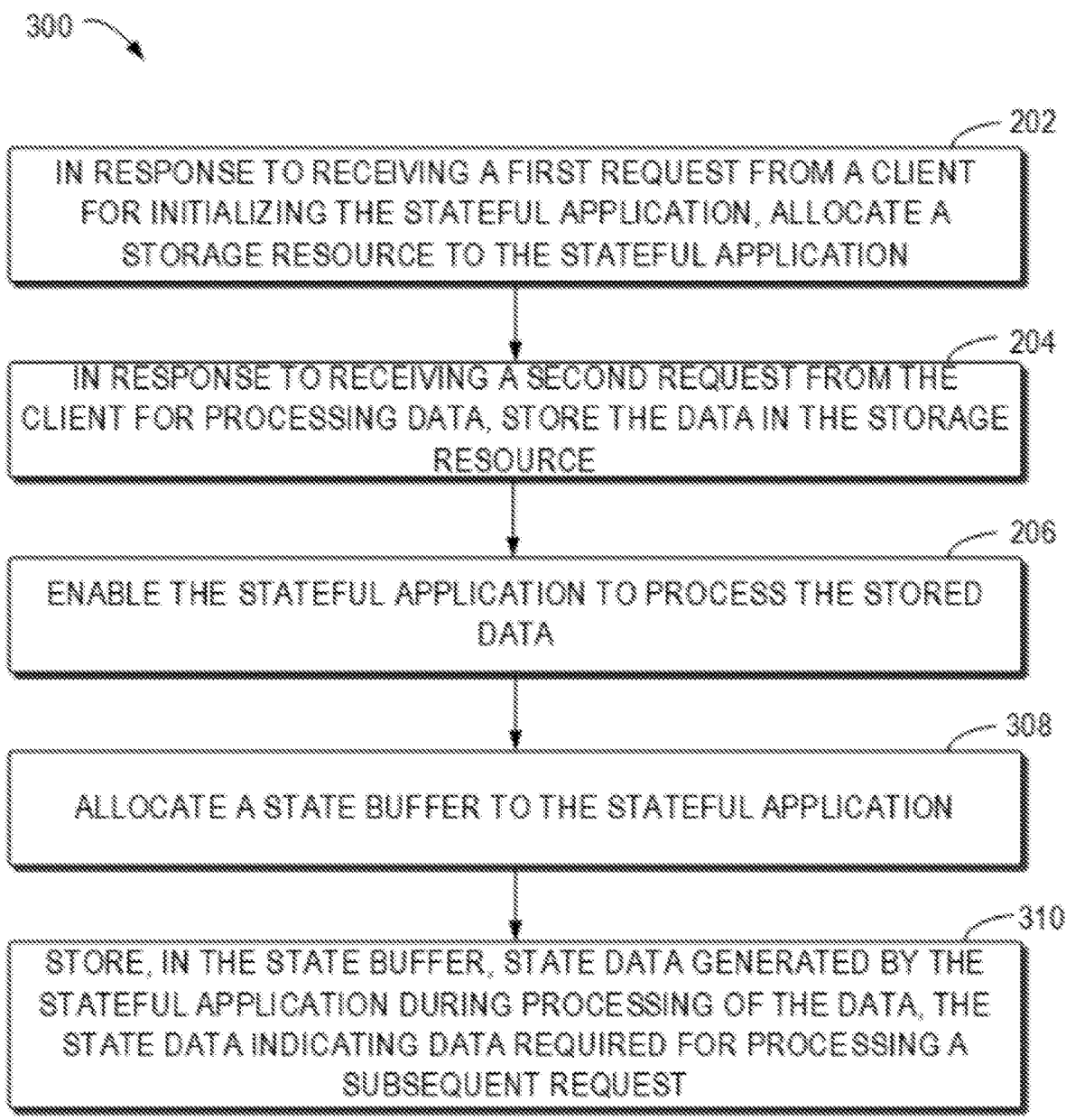
FIG. 3 illustrates a flowchart of a method 300 of performing a stateful application on a server according to embodiments of the present disclosure.

FIG. 3 illustrates a flowchart of a method 300 of performing a stateful application on server according to embodiments of the present disclosure. Since 202-206 in FIG. 3 have been described in FIG. 2, the detailed description thereof is omitted herein. Blocks 308-310 in FIG. 3 will be mainly described.

When the stateful application is operated at the server end, the stored data processed by the stateful application generates state data. Since the state data will be used by the subsequent request, a buffer is allocated at the server for storing state data. By providing a buffer on the server for the stateful application, the problem of wasting the network resource and reducing the data processing speed is effectively solved, where the problem is caused by returning the state data to the client when the stateful application is operated on the server. The stored state data can be used directly at the server end for directly processing the subsequent processing request.

At 308, a state buffer is allocated to the stateful application. Due to a limited storage capacity of the memory on the server, the buffer area provided for the stateful application has a limited size.

After the state buffer is allocated to the stateful application, at 310, the stateful application generates the state data in the procedure of processing data, the state data indicate data required for processing the subsequent request, and the state data then are stored in the state buffer.

The procedure of operating the stateful application in the server has been described above. Due to a limited storage resource on the server end, how to allocate the storage resource for the stateful application will be described with reference to FIG. 4.

Due to the limited storage resource, various problems arise when the stateful application obtains a resource from the server. If the stored resource is allocated to a stateful application which comes first, it will cause a problem that a stateful application not in urgent need of processing occupies the resource of the server for a long time while a subsequent stateful application in urgent need of processing cannot be operated, and in order to process various stateful applications optimally, priorities are provided for various stateful applications in embodiments of the present disclosure.

There are multiple methods for providing a priority. In an alternative embodiment, the priority of the stateful application can be set by a user. In another alternative embodiment, the priority of the stateful application can be preset. In another alternative embodiment, the priority of the stateful application can be set in another manner.

For the stateful application provided with a priority, when the storage resource is allocated to it on the server, the priority of the stateful application is first determined at block 402. After the priority of the stateful application is determined, when it is desired to obtain the storage resource, it is first determined whether the storage resource of the server end is sufficient at block 404. If the storage resource is sufficient, it moves to block 410 to allocate the storage resource to the stateful application.

If the storage resource of the server is insufficient, at block 406, it is required to determine whether the priority of the stateful application is lower than priorities of other stateful applications within the server, and if no, the procedure moves to block 410 to allocate the storage resource to it.

If the priority of the stateful application is lower than the priorities of other stateful applications within the server, the stateful application cannot obtain the storage resource temporarily and needs to wait for the storage resource to be released by the server, at block 408. If the sufficient resource is released subsequently, then the storage resource is allocated to the stateful application.

Figure 4:
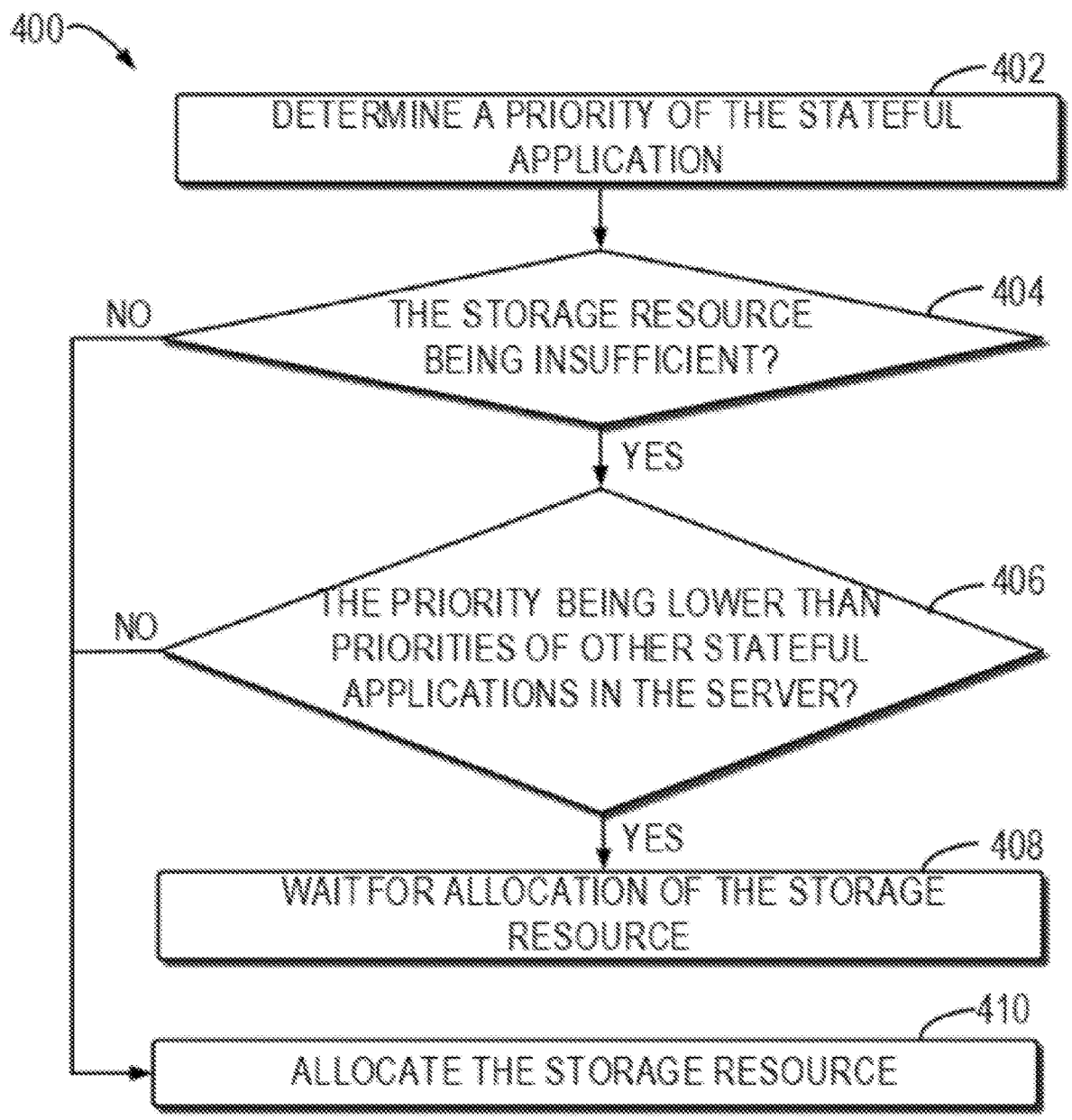
FIG. 4 illustrates a flowchart of a method 400 of allocating a storage resource for a stateful application according to embodiments of the present disclosure.
Figure 5:
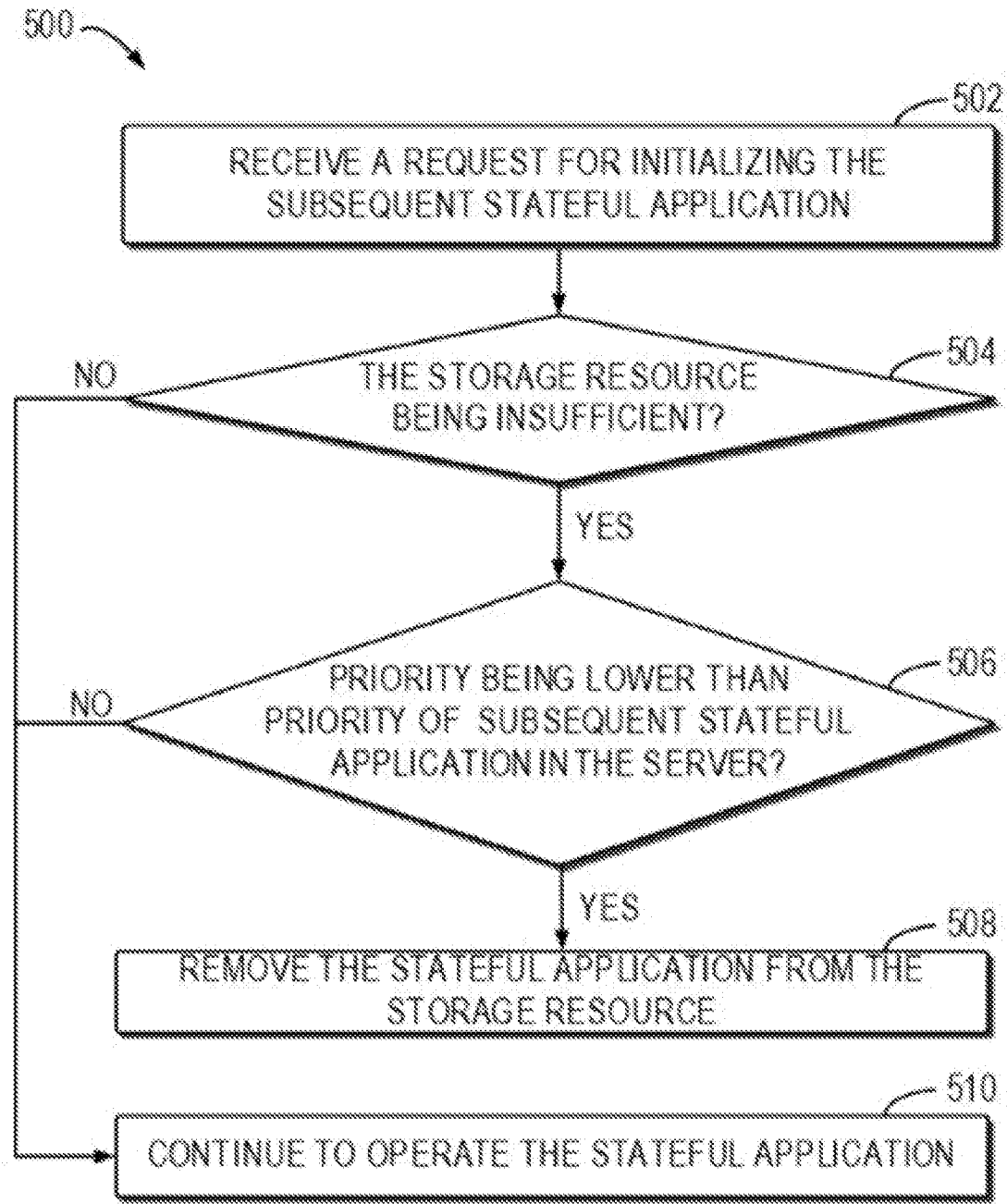
FIG. 5 illustrates a flowchart of a method 500 of processing a storage resource by a stateful application according to embodiments of the present disclosure.

The above description describes a method 400 of allocating the storage resource to the stateful application when it is initialized as illustrated in FIG. 4, and the method 500 of processing a storage resource in a procedure of operating a stateful application shown in FIG. 5 will be described below.

In the procedure of operating the stateful application, when there is a subsequent stateful application to be operated, the client transmits a request for initializing the subsequent stateful application to a controller, and the controller receives the request for initializing the subsequent stateful application at block 502. Upon receiving the initialization request of the subsequent stateful application, it is required to determine whether the storage resource of the server is sufficient at 504, and if the storage resource is sufficient, the stateful application continues to be operated.

If the priority of the stateful application is lower than a priority of a subsequent stateful application, at 508, the current stateful application is removed out of the storage resource and the storage resource is allocated to the subsequent stateful application. The data of the stateful application removed out of the storage resource are duplicated into other storage devices and are recoverable. The removed stateful application continues to be operated in the server when the storage resource in the server satisfies its operation condition again. In another alternative embodiment, the data of the removed stateful application are stored in an external large-capacity storage device. In another alternative embodiment, the removed data can be stored in any appropriate storage device.

Figure 6:
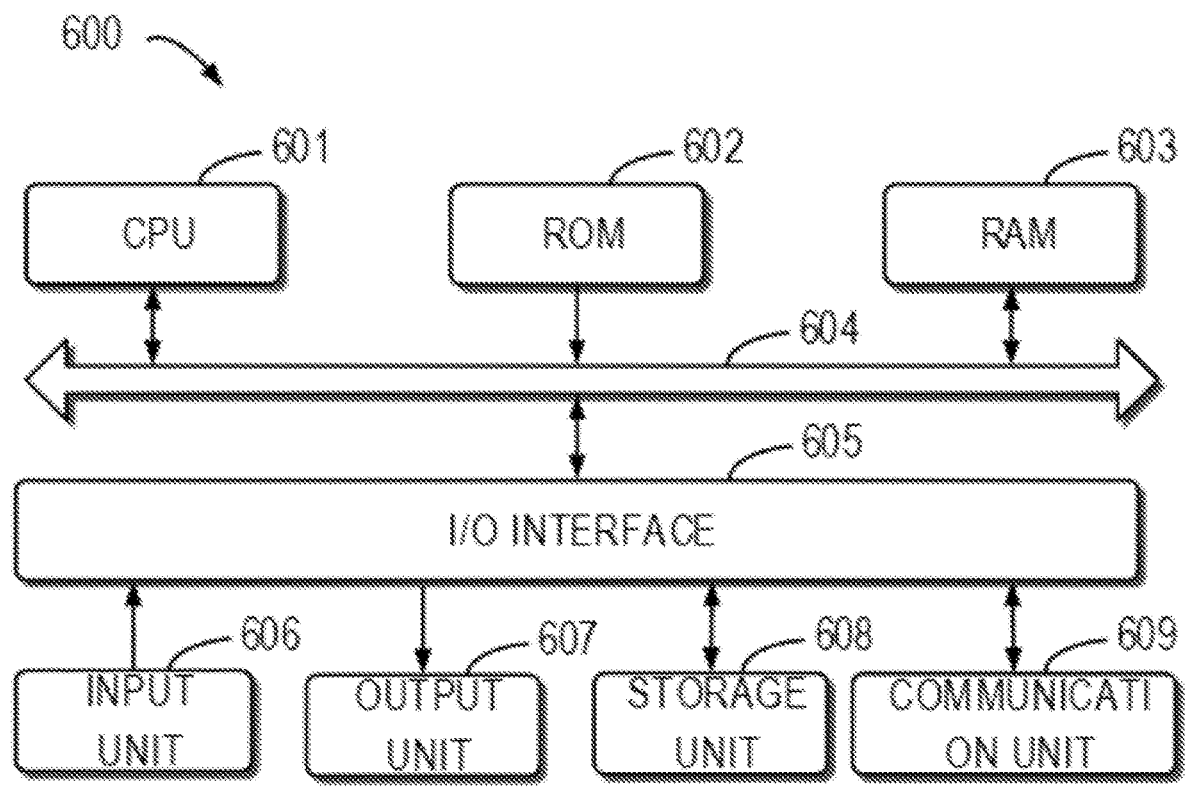
FIG. 6 illustrates a block diagram of an example device 600 suitable for implementing embodiments of the present disclosure.

FIG. 6 illustrates a schematic diagram of an example device 600 that can be used to implement embodiments of the present disclosure. For example, any one of 102, 108, 112 and 114 as shown in FIG. 1 can be implemented by a device 600. As shown, the device 600 includes a central processing unit (CPU) 601 that can perform various appropriate acts and processing based on computer program instructions stored in a read-only memory (ROM) 602 or computer program instructions loaded from a storage unit 608 to a random access memory (RAM) 603. In the RAM 603, various programs and data needed for operations of the device 600 are also stored. The CPU 601, ROM 602 and RAM 603 are connected to each other via a bus 604. An input/output (I/O) interface 605 is also connected to the bus 604.

The following components in the device 600 are connected to the I/O interface 605: an input unit 606, such as a keyboard, a mouse and the like; an output unit 607, such as various kinds of displays and a loudspeaker, etc.; a storage unit 608, such as a magnetic disk, an optical disk, etc.; a communication unit 609, such as a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the methods 200, 300, 400 and 500, can be executed by the processing unit 601. For example, in some embodiments, the methods 200, 300, 400 and 500 can be implemented as a computer software program that is tangibly stored on a machine readable medium, e.g., the storage unit 608. In some embodiments, part or all of the computer programs can be loaded and/or mounted onto the device 600 via ROM 602 and/or communication unit 609. When the computer program is loaded to the RAM 603 and executed by the CPU 601, one or more acts of the methods 200, 300, 400 or 500 as described above can be performed.

The present disclosure can be a method, a device, a system and/or a computer program product. The computer program product can include a computer readable storage medium on which computer readable program instructions are carried for performing each aspect of the present application.

The computer readable medium may be a tangible medium that may contain and store instruction for use by an instruction execution device. The computer readable storage medium for example can be, but not limited to, an electronic storage device, magnetic storage device, optical storage device, electromagnetic storage device, semiconductor storage device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for preforming operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the scenario relating to the remote computer, the remote computer may be connected to the user's computer through any type of network, including a local area network (LAN) or a wide area network (WAN), or be connected to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart and/or block diagrams of methods, apparatus (systems), and computer program products according to embodiments of the disclosure. It would be understood that each block of the flowchart and/or block diagrams, and combinations of blocks in the flowchart and/or block diagrams, can be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means for implementing the functions/acts specified in the block or blocks of the flowchart and/or block diagram. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in block or blocks of the flowchart and/or block diagram.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing two or more stateful applications on a server, comprising:

in response to receiving a first request from a client for initializing a first one of the two or more stateful applications on the server to utilize one or more hardware acceleration devices of the server, allocating a storage resource to the first stateful application based at least in part on determining a first priority of the first stateful application relative to at least a second priority of a second one of the two or more stateful applications;

sending, to the client, an indication of the storage resource allocated to the first stateful application;

allocating at least a given portion of a state buffer in a memory of the server to the storage resource allocated to the first stateful application, the given portion of the state buffer being configured to store state information of the first stateful application, the storage resource also being allocated to the second stateful application;

in response to receiving a second request from the client comprising the indication and an instruction to complete one or more data processing operations of the first stateful application for processing data, identifying the allocated storage resource based at least in part on the indication and storing the data in the given portion of the state buffer;

enabling the first stateful application to process the stored data on the server by configuring the one or more hardware acceleration devices of the server to utilize state information stored in the given portion of the state buffer for executing the one or more data processing operations of the first stateful application, the one or more data processing operations executed by the one or more hardware acceleration devices of the server generating additional state information for the first stateful application; and storing the generated additional state information for the first stateful application in the given portion of the state buffer;

wherein allocating the storage resource to the first stateful application comprises:

determining whether the state buffer in the memory of the server has sufficient available storage capacity for concurrent allocation of storage resources for the first stateful application and the second stateful application; and responsive to determining that the stateful buffer does not have sufficient available storage capacity for concurrent allocation of storage resources for the first stateful application and the second stateful application, suspending operation of one of the first stateful application and the second stateful application based at least in part on determining the first priority of the first stateful application relative to the second priority of the second stateful application;

wherein the first request is received over a first interface between the client and the server;

wherein the second request comprising data to be processed for the first stateful application is received over a second interface, the second interface comprising a remote direct memory access connection between the client and the allocated storage resource;

wherein suspending operation of said one of the first stateful application and the second stateful application comprises removing state information of said one of the first stateful application and the second stateful application from the state buffer and storing the removed state information of said one of the first stateful application and the second stateful application in at least one storage device external to the memory of the server;

wherein suspending operation of said one of the first stateful application and the second stateful application further comprises comparing the first priority of the first stateful application with the second priority of the second stateful application and, in response to the first priority being lower than the second priority, suspending the initializing of the first stateful application to wait for the storage resource.

2. The method according to claim 1, further comprising:
in response to receiving a request from the client for initializing a subsequent stateful application, determining whether the server has an available storage resource sufficient to satisfy the initializing of the subsequent stateful application;
in response to the available storage resource being insufficient, comparing the first priority of the first stateful application with a third priority of the subsequent stateful application; and
in response to the first priority being lower than the third priority, re-allocating at least a part of the storage resource from the first stateful application to the subsequent stateful application.

3. The method of claim 2, wherein re-allocating at least a part of the storage resource from the first stateful application to the subsequent stateful application comprises duplicating data of the first stateful application into the at least one storage device external to the memory of the server and removing the data of the first stateful application from the part of the storage resource that is re-allocated to the subsequent stateful application.

4. The method of claim 1, wherein the state information stored in the state buffer comprises data from one or more previous ones of the one or more data processing operations of the first stateful application that is to be utilized in one or more subsequent ones of the one or more data processing operations of the first stateful application.

5. The method of claim 4, wherein the data from the one or more previous data processing operations of the first stateful application is stored as the state information in the state buffer without transmitting the state information to the client.

6. The method of claim 1, wherein the first stateful application comprises a data compression application configured to compress a set of data in two or more steps, and the state information maintained in the state buffer comprises information from a preceding one of the two or more data compression steps that is to be utilized for a subsequent one of the two or more data compression steps.

7. The method of claim 1, wherein the first stateful application comprises a web application that utilizes session and cookie information for two or more web application requests, and the state information maintained in the state buffer comprises session and cookie information for a preceding one of the two or more web application requests that is to be utilized for a subsequent one of the two or more web application requests.

8. The method of claim 1, wherein the indication comprises at least one of an identifier of the allocated storage resource and address information for the allocated storage resource.

9. The method of claim 1, wherein the second request comprises a remote direct memory access (RDMA) request submitted over a network through a RDMA network interface controller enabling the client to directly access the allocated storage resource.

10. An electronic device for managing two or more stateful applications on a server, comprising:
a processor; and
a memory having computer program instructions stored thereon, the processor executing the computer program instructions in the memory to control the electronic device to perform acts comprising:
in response to receiving a first request from a client for initializing a first one of the two or more stateful applications on the server to utilize one or more hardware acceleration devices of the server, allocating a storage resource to the first stateful application based at least in part on determining a first priority of the first stateful application relative to at least a second priority of a second one of the two or more stateful applications;
sending, to the client, an indication of the storage resource allocated to the first stateful application;
allocating at least a given portion of a state buffer in a memory of the server to the storage resource allocated to the first stateful application, the given portion of the state buffer being configured to store state information of the first stateful application, the storage resource also being allocated to the second stateful application;
in response to receiving a second request from the client comprising the indication and an instruction to complete one or more data processing operations of the first stateful application for processing data, identifying the allocated storage resource based at least in part on the indication and storing the data in the given portion of the state buffer;
enabling the first stateful application to process the stored data on the server by configuring the one or more hardware acceleration devices of the server to utilize state information stored in the given portion of the state buffer for executing the one or more data processing operations of the first stateful application, the one or more data processing operations executed by the one or more hardware acceleration devices of the server generating additional state information for the first stateful application; and storing the generated additional state information for the first stateful application in the given portion of the state buffer;

wherein allocating the storage resource to the first stateful application comprises:

determining whether the state buffer in the memory of the server has sufficient available storage capacity for concurrent allocation of storage resources for the first stateful application and the second stateful application; and responsive to determining that the stateful buffer does not have sufficient available storage capacity for concurrent allocation of storage resources for the first stateful application and the second stateful application, suspending operation of one of the first stateful application and the second stateful application based at least in part on determining the first priority of the first stateful application relative to the second priority of the second stateful application;

wherein the first request is received over a first interface between the client and the server;

wherein the second request comprising data to be processed for the first stateful application is received over a second interface, the second interface comprising a remote direct memory access connection between the client and the allocated storage resource;

wherein suspending operation of said one of the first stateful application and the second stateful application comprises removing state information of said one of the first stateful application and the second stateful application from the state buffer and storing the removed state information of said one of the first stateful application and the second stateful application in at least one storage device external to the memory of the server;

wherein suspending operation of said one of the first stateful application and the second stateful application further comprises comparing the first priority of the first stateful application with the second priority of the second stateful application and, in response to the first priority being lower than the second priority, suspending the initializing of the first stateful application to wait for the storage resource.

11. The electronic device according to claim 10, further comprising:

in response to receiving a request from the client for initializing a subsequent stateful application, determining whether the server has an available storage resource sufficient to satisfy the initializing for the subsequent stateful application;

in response to the available storage resource being insufficient, comparing the first priority of the first stateful application with a third priority of the subsequent stateful application; and in response to the first priority being lower than the third priority, re-allocating at least a part of the storage resource from the first stateful application to the subsequent stateful application.

12. The electronic device according to claim 10, wherein the state information stored in the state buffer comprises data from one or more previous ones of the one or more data processing operations of the first stateful application that is to be utilized in one or more subsequent ones of the one or more data processing operations of the first stateful application, and wherein the data from the one or more previous data processing operations of the first stateful application is stored as the state information in the state buffer without transmitting the state information to the client.

13. The electronic device according to claim 10, wherein re-allocating at least a part of the storage resource from the first stateful application to the subsequent stateful application comprises duplicating data of the first stateful application into the at least one storage device external to the memory of the server and removing the data of the first stateful application from the part of the storage resource that is re-allocated to the subsequent stateful application.

14. A computer program product for managing two or more stateful applications on a server, the computer program product comprising:

a non-transitory computer readable medium encoded with computer-executable code, the code configured to enable the execution of:

in response to receiving a first request from a client for initializing a first one of the two or more stateful applications on the server to utilize one or more hardware acceleration devices of the server, allocating a storage resource to the first stateful application based at least in part on determining a first priority of the first stateful application relative to at least a second priority of a a second one of the two or more stateful applications;

sending, to the client, an indication of the storage resource allocated to the first stateful application;

allocating at least a given portion of a state buffer in a memory of the server to the storage resource allocated to the first stateful application, the given portion of the state buffer being configured to store state information of the first stateful application, the storage resource also being allocated to the second stateful application;

in response to receiving a second request from the client comprising the indication and an instruction to complete one or more data processing operations of the first stateful application for processing data, identifying the allocated storage resource based at least in part on the indication and storing the data in the given portion of the state buffer;

enabling the first stateful application to process the stored data on the server by configuring the one or more hardware acceleration devices of the server to utilize state information stored in the given portion of the state buffer for executing the one or more data processing operations of the first stateful application, the one or more data processing operations executed by the one or more hardware acceleration devices of the server generating additional state information for the first stateful application; and storing the generated additional state information for the first stateful application in the given portion of the state buffer;

wherein allocating the storage resource to the first stateful application comprises:

determining whether the state buffer in the memory of the server has sufficient available storage capacity for concurrent allocation of storage resources for the first stateful application and the second stateful application; and responsive to determining that the stateful buffer does not have sufficient available storage capacity for concurrent allocation of storage resources for the first stateful application and the second stateful application, suspending operation of one of the first stateful application and the second stateful application based at least in part on determining the first priority of the first stateful application relative to the second priority of the second stateful application;

wherein the first request is received over a first interface between the client and the server; and wherein the second request comprising data to be processed for the first stateful application is received over a second interface, the second interface comprising a remote direct memory access connection between the client and the allocated storage resource;

wherein suspending operation of said one of the first stateful application and the second stateful application comprises removing state information of said one of the first stateful application and the second stateful application from the state buffer and storing the removed state information of said one of the first stateful application and the second stateful application in at least one storage device external to the memory of the server;

wherein suspending operation of said one of the first stateful application and the second stateful application further comprises comparing the first priority of the first stateful application with the second priority of the second stateful application and, in response to the first priority being lower than the second priority, suspending the initializing of the first stateful application to wait for the storage resource.

15. The computer program product of claim 14, wherein the code is further configured to enable the execution of:

in response to receiving a request from the client for initializing a subsequent stateful application, determining whether the server has an available storage resource sufficient to satisfy the initializing of the subsequent stateful application;

in response to the available storage resource being insufficient, comparing the first priority of the first stateful application with a third priority of the subsequent stateful application; and in response to the first priority being lower than the third priority, re-allocating at least a part of the storage resource from the first stateful application to the subsequent stateful application.

16. The computer program product of claim 14, wherein the state information stored in the state buffer comprises data from one or more previous ones of the one or more data processing operations of the first stateful application that is to be utilized in one or more subsequent ones of the one or more data processing operations of the first stateful application, and wherein the data from the one or more previous data processing operations of the first stateful application is stored as the state information in the state buffer without transmitting the state information to the client.

17. The computer program product of claim 14, wherein re-allocating at least a part of the storage resource from the first stateful application to the subsequent stateful application comprises duplicating data of the first stateful application into the at least one storage device external to the memory of the server and removing the data of the first stateful application from the part of the storage resource that is re-allocated to the subsequent stateful application.

18. The computer program product of claim 14, wherein the first stateful application comprises a data compression application configured to compress a set of data in two or more steps, and the state information maintained in the state buffer comprises information from a preceding one of the two or more data compression steps that is to be utilized for a subsequent one of the two or more data compression steps.

19. The computer program product of claim 14, wherein the first stateful application comprises a web application that utilizes session and cookie information for two or more web application requests, and the state information maintained in the state buffer comprises session and cookie information for a preceding one of the two or more web application requests that is to be utilized for a subsequent one of the two or more web application requests.

20. The computer program product of claim 14, wherein the second request comprises a remote direct memory access (RDMA) request submitted over a network through a RDMA network interface controller enabling the client to directly access the allocated storage resource.

* * * * *